US011304056B2

(12) United States Patent
 D. R.

(10) Patent No.: US 11,304,056 B2
(45) Date of Patent: Apr. 12, 2022

(54) SYSTEM AND METHOD FOR DETECTING UNAUTHORIZED DEVICES IN A SYSTEM OF TELECOM NETWORKS

(71) Applicant: Shakuntala D. R., Bangalore (IN)

(72) Inventor: Shakuntala D. R., Bangalore (IN)

( * ) Notice: Subject to any disclaimer, the term of this patent is extended or adjusted under 35 U.S.C. 154(b) by 2 days.

(21) Appl. No.: 17/059,451

(22) PCT Filed: Jul. 19, 2018

(86) PCT No.: PCT/IB2018/055376
§ 371 (c)(1),
(2) Date: Nov. 29, 2020

(87) PCT Pub. No.: WO2019/234480
PCT Pub. Date: Dec. 12, 2019

(65) Prior Publication Data
US 2021/0211875 A1 Jul. 8, 2021

(30) Foreign Application Priority Data

Jun. 6, 2018 (IN) .............................. 201841021209

(51) Int. Cl.
| *H04W 12/72* | (2021.01) |
| *H04W 12/06* | (2021.01) |
| *H04W 12/50* | (2021.01) |
| *H04W 12/71* | (2021.01) |
| *H04W 12/12* | (2021.01) |

(52) U.S. Cl.
CPC ......... *H04W 12/068* (2021.01); *H04W 12/12* (2013.01); *H04W 12/50* (2021.01); *H04W 12/71* (2021.01); *H04W 12/72* (2021.01)

(58) Field of Classification Search
CPC .... H04W 12/041; H04W 12/50; H04W 12/06
See application file for complete search history.

(56) References Cited

U.S. PATENT DOCUMENTS

| 2017/0140144 A1* | 5/2017 | Bock ........................ G06T 7/74 |
| 2020/0380113 A1* | 12/2020 | Bock ................... G03H 1/0011 |
| 2020/0396517 A1* | 12/2020 | Hodge ............. H04N 21/47217 |

* cited by examiner

*Primary Examiner* — Michael T Vu
(74) *Attorney, Agent, or Firm* — Heena N Kampani; Law Office to Heena N. Kampani

(57) ABSTRACT

The present disclosure relates to authentication system, and, more specifically, to system and method for suppression/prevention of the use of cloned/unauthentic cell phone devices in a cellular network. More specifically, system and method enables for detecting an authorized/unauthorized device in the network. Accordingly, an aspect of the present disclosure relates to a system for detecting an authorized device in a network. The system can include a database of authorized pairs/combinations of connection identifications (IDs) and device identifications (IDs), and a network monitor and server.

15 Claims, 5 Drawing Sheets

SYSTEM AND METHOD FOR DETECTING UNAUTHORIZED DEVICES IN A SYSTEM OF TELECOM NETWORKS

TECHNICAL FIELD

The present disclosure relates to authentication system, and, more specifically, to system and method for suppression/prevention of the use of cloned/unauthentic cell phone devices in a cellular network. More specifically, system and method enables for detecting authorized/unauthorized device in the network.

BACKGROUND

Background description includes information that may be useful in understanding the present invention. It is not an admission that any of the information provided herein is prior art or relevant to the presently claimed invention, or that any publication specifically or implicitly referenced is prior art.

The following description is made primarily with reference to the GSM communication system. Those skilled in the art will appreciate, however, that the techniques and systems described below may also be applied to other communication systems, for example third/fourth generation (3G/4G) networks and Internet protocol multimedia subsystem (IMS) networks, in the same or similar manners.

The popularity of mobile communication devices such as, for example, mobile telephones, wireless data devices and similar devices has resulted in more and more such devices being used in mobile communication networks. Communication devices for use on the GSM network are manufactured with a unique hardware identifier, known as the International Mobile Equipment Identifier (IMEI). Each communication device is also associated with a unique subscriber identifier, known as an international mobile subscriber identifier (IMSI) which uniquely identifies a subscriber of a communication network. In GSM communication networks the IMSI is stored on a subscriber identity module (SIM) card that is provided by the operator of the communication network.

Whenever a communication device attempts to attach or connect to a communication network the IMEI and IMSI are sent to the communication network. The received IMEI can be checked against an Equipment Identity Register (EIR) that maintains a list of known stolen IMEIs, and network access to known stolen devices can thus be blocked. However, the IMEI of a communication device is only entered in an EIR when the device is reported lost or stolen by the owner. As a consequence, stolen devices may often be used for some time before being blocked by the network operator.

Kang, Dong W., et ah, "A practical attack on mobile data network using IP spoofing," Applied Mathematics & Information Sciences 7.6 (2013): 2345, which is incorporated herein by reference, analyzes security threats that occurred to mobile networks recently, and checks the security threats likely to occur in actual commercial service networks and their results. The paper further proposes a countermeasure that can respond to such security threats, and presents results that can be applied to actual commercial networks.

Theft of mobile communication devices, such as mobile telephones, has long been a problem. This is due largely to their relatively small size, their mobility, and their resale value. As mobile communication devices become increasingly sophisticated, so their retail value typically increases. The downside of this, however, is that their attractiveness to thieves also grows. Despite numerous security measures being in place, the theft of mobile communication devices continues to be a major problem. In these cases it would be desirable to be able to provide anti-theft measure or security measures.

Many communication devices supplied by network operators are also SIM-locked so that they may be used only with subscriber identity modules (SIM) cards provided by the network operator. Although not originally intended as an anti-theft measure, this does, in theory at least, reduce the value of a stolen handset since the communication device will only work on the network of the network operator who originally provided the communication device. However, communication devices may, in general, be de-SIM-locked relatively easily, thereby enabling stolen communication devices to be used on any compatible communication network.

Many communication devices are also provided with local device-based security features that prompt a user for a predetermined PIN code each time a communication device is powered on. Many communication devices also provide a device-based security feature that prompts a user for a predetermined PIN code whenever a different SIM card is used with the device. However, such features are somewhat inconvenient to users. Furthermore, since users are prone to forget such PIN codes communication devices are designed to accept master security reset codes, for example provided by network operators/manufacturers, to enable such security features to be reset. However, such unlocking codes are generally fairly straightforward to obtain, for example through the Internet, enabling such security features to be overcome without great difficulty.

However, in Telecom Networks, every connection has some connection identifier (ID) or unique subscriber identifier like phone number (hereinafter interchangeably referred as connection ID or unique subscriber identifier or IMSI) and device used with that connection has some device identifier or unique hardware identifier (hereinafter interchangeably referred as device ID or hardware identifier or IMEI). In a network there may be many pairs of connection ID and device ID. Some device ID may be used with multiple connection IDs like changing SIM cards in a Device and also some connection ID may be used with multiple Device IDs like same sim card may be used with many devices. Ideally one Device ID should be allowed with only one Connection ID. But if this condition is strictly enforced, and if in the system, there are devices having cloned device IDs then following problems will arise:

a) Out of the devices having cloned device ID, it will not be possible to identify which device is having cloned device ID and which device is having original device ID without physical verification of handset and other investigation, so this is mammoth and impractical exercise. Even after this exercise, there remains the problem about, how to block the devices having cloned device ID, because device having same device ID but the original one needs to be allowed in the system.

b) If we strictly impose the condition that only one device ID should be allowed with only one Connection ID, then it will not be possible for genuine user to change the number for same handset or change the handset for same number.

Thus the conventional system or method also creates a lot of disturbances in the working of whole system. Hence there is a requirement of a procedure/protocol to take care of these situations and ensure the usage of allowed devices in the system of telecom networks under consideration.

Therefore there is a need to provide a new, efficient, and technically advanced system and method for suppression/prevention of the use of cloned/unauthentic cell phone devices in a cellular network and/or detecting an authorized/unauthorized device in the network. Further, there is also a need to provide such a system and method to regulate and/or control the usage of device ID, so as to minimize the usage of unauthorized devices in the network. Furthermore there is a dire need to provide a new and secure security system to control access to a communication network and to prevent/minimize communication devices from being used by unauthorized subscribers.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a", "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

An object of the present disclosure is to provide a system and method for suppression/prevention of the use of cloned/unauthentic cell phone devices in a cellular network and/or detecting an authorized/unauthorized device in the network.

Another object of the present disclosure is to provide a system and method to control or regulate the usage of unauthorized devices in the network.

Another object of the present disclosure is to provide system and method to regulate and/or control the usage of device ID, so as to minimize the usage of unauthorized devices in the network.

SUMMARY

The present disclosure relates to authentication system, and, more specifically, to system and method for suppression/prevention of the use of cloned/unauthentic cell phone devices in a cellular network. More specifically, system and method enables for detecting an authorized/unauthorized device in the network.

Accordingly, an aspect of the present disclosure relates to a system for detecting an authorized device in a network. The system can include a database of authorized pairs/combinations of connection identifications (IDs) and device identifications (IDs), and a network monitor and server.

In an aspect, the system for detecting an authorized device can include database of authorized pairs/combinations of connection identifications (IDs) and device identifications (IDs), each record of said database having at least a pair/combination of connection identification (ID) and device identification (ID). In an aspect, the device identification (ID) can be an ID associated with a device, and connection identification (ID) is an ID by which the system identifies a network connection uniquely. In another aspect, the system can include a network monitor and server to receive a message either from a device or from a service provider of said device for authentication. In another aspect, the message can include at least a pair/combination of at least a connection ID and at least a device ID, the network monitor and server being further configured to query said database of authorized pairs/combinations to determine presence of said pair/combination as received in the message. In another aspect, the network monitor and server, in case if absence of the said pair/combination in said database is determined indicating a new pair/combination, and if the device ID in new pair/combination matches with the device ID of at least one authorized pair/combination already available in the database, said network monitor and server is characterized to obtain, from a user of the device, a linking code to associate the new pair/combination with at least one existing authorized pair/combination in the database whose device ID is same as that of the new pair/combination, and authenticate based at least on the linking code obtained from the user, the device and said new pair/combination for the network as the authorized device and authorized pair combination.

In an aspect, the new pair/combination can include any or combination of an existing device ID and existing connection ID (but not paired with each other as per the database); an existing device ID (already available in the database) and a new connection ID; a new device ID and an existing connection ID (already available in the database); and a new device ID and a new connection ID.

In an aspect, the linking code can be sent from the connection ID of a existing authorized pair/combination in the database whose device ID is same as the device ID of the said new pair/combination. In another aspect the linking code can be sent from connection ID received in the new pair/combination.

In an aspect, the linking code can be a one-time password (OTP) sent to the connection ID of a existing authorized pair/combination in the database whose device ID is same as the device ID of said new pair/combination, and obtained, from the user, from the connection ID selected from said new pair/combination.

In an aspect, the linking code can be a one-time password (OTP) sent to the connection ID of the new pair/combination, and obtained, from the user, from the connection ID of a existing authorized pair/combination in the database whose device ID is same as the device ID of said new pair/combination.

In an aspect, upon authentication, the new pair/combination of the connection ID and the device ID can be authenticated for the network and stored in the database.

In an aspect, upon authentication failure, the new pair/combination of the connection ID and the device ID is not authenticated for the network. However it can be stored for further processing.

In an aspect, the linking code can be any identification (ID) by use of which the connection ID is identified.

In an aspect, if the device ID is not available in the database, the new pair/combination of the connection ID and the device ID is stored in the database. This can be subjected to other existing validation methods for device ID.

In an aspect, the connection ID can be selected from any or combination of International Mobile Subscriber Identity (IMSI), phone number, and SIM card number.

In an aspect, the device ID can be selected from any or combination of International Mobile Equipment Identity (IMEI) or Electronic Serial Number (ESN).

An aspect of the present disclosure relates to a method for detecting an authorized device in a network. The method for detecting an authorized device in a network can include the steps of: generating, a database of authorized pairs/combinations of connection identifications (IDs) and a device identifications (IDs), each record of said database having at least a pair/combination of at least a connection identification (ID) and at least a device identification (ID), wherein the device identification (ID) is an ID associated with a device, and a connection identification (ID) is an ID by which the system identifies a network connection uniquely; receiving, by a network monitor and server, a message either from a device or from a service provider for said device for authentication, the message comprising at least a pair/combination of at least a connection ID and at least a device ID, the network monitor and server further querying said database of authorized pairs/combinations to determine presence of said pair/combination as received in the message; said method characterized by comprising the steps of: obtaining, by the said network monitor and server, if absence of the said pair/combination in database is determined indicating a new pair/combination, and if the device ID in new pair/combination matches with the device ID of at least one authorized pair/combination already available in the database, from a user of the device, a linking code to associate the new pair/combination with at least one existing authorized pair/combination in the database whose device ID is same as that of the new pair/combination; and authenticating, by the said network monitor and server, the device and said new pair/combination for the network, based at least on the linking code obtained from the user, as the authorized device and authorized pair/combination.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

Figure 1A:
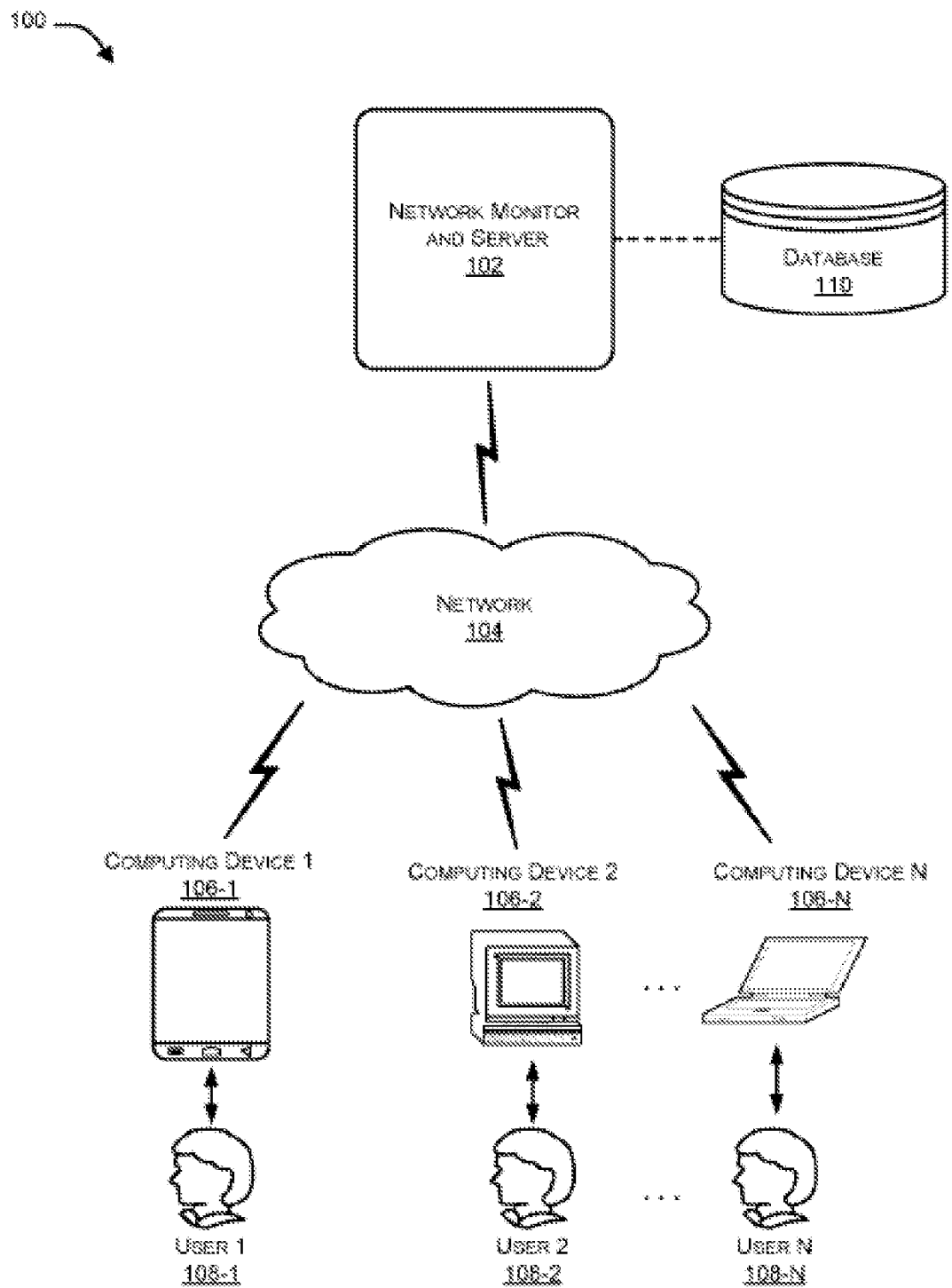
FIGS. 1A-B illustrates a network implementation of proposed system for detecting an authorized/unauthorized device in the network, in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

If the specification states a component or feature"may", "can", "could", or "might" be included or have a characteristic, that particular component or feature is not required to be included or have the characteristic.

As used in the description herein and throughout the claims that follow, the meaning of "a," "an," and"the" includes plural reference unless the context clearly dictates otherwise. Also, as used in the description herein, the meaning of"in" includes"in" and"on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure or given name). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to authentication system, and, more specifically, to system and method for suppression/prevention of the use of cloned/unauthentic cell phone devices in a cellular network. More specifically, system and method enables for detecting an authorized/unauthorized device in the network.

Accordingly, an aspect of the present disclosure relates to a system for detecting an authorized device in a network. The system can include a database of authorized pairs/combinations of connection identifications (IDs) and a device identifications (IDs), and a network monitor and server.

In an aspect, the system for detecting an authorized device can include database of authorized pairs/combinations of connection identifications (IDs) and a device identifications (IDs), each record of said database having at least a pair/combination of at least a connection identification (ID) and at least a device identification (ID). In an aspect, the device identification (ID) can be an ID associated with a device, and connection identification (ID) is an ID by which the system identifies a network connection uniquely. In another aspect, the system can include a network monitor and server to receive a message either from a device or from a service provider for said device for authentication. In another aspect, the message can include at least a pair/combination of at least a connection ID and at least a device ID, the network monitor and server being further configured to query the database of authorized pairs/combinations to determine presence of said pair/combination as received in the message. In another aspect, network monitor and server, in case if absence of the said pair/combination in said database is determined indicating a new pair/combination, and if the device ID in new pair/combination matches with the device ID of at least one authorized pair/combination already available in the database, the network monitor and server is characterized to obtain, from a user of the device, a linking code to associate the new pair/combination with at least one existing authorized pair/combination in the database whose device ID is same as that of the new pair/combination and authenticate, based at least on the linking code obtained from the user, the device and said new pair/combination for the network, as the authorized device and authorized pair/combination.

In an aspect connection ID can be any or combination of parameters configured to collectively or individually identify the network connection uniquely. In another aspect device ID can be any or combination of parameters configured to collectively or individually identify the device.

In an aspect, the new pair/combination can include any or combination of an existing device ID and existing connection ID (but not paired with each other as per the database); an existing device ID (already available in the database) and a new connection ID; a new device ID and an existing connection ID (already available in the database); and a new device ID and a new connection ID.

In an aspect, the linking code can be sent from the connection ID of said existing authorized pair/combination in the database whose device ID is same as the device ID of the said new pair/combination. In another aspect the linking code can be sent from the connection ID received in said new pair/combination.

In an aspect, the linking code can be a one-time password (OTP) sent to the connection ID of said existing authorized pair/combination in the database whose device ID is same as the device ID of the said new pair/combination, and obtained, from the user, from the connection ID selected from said new pair/combination.

In an aspect, the linking code can be a one-time password (OTP) sent to the connection ID selected from said new pair/combination, and obtained, from the user, from the connection ID of said existing authorized pair/combination in the database whose device ID is same as the device ID of the said new pair/combination.

In an aspect, upon authentication, the new pair/combination of the connection ID and the device ID can be authenticated for the network.

In an aspect, upon authentication failure, the new pair/combination of the connection ID and the device ID is not authenticated for the network.

In an aspect, the linking code can be any identification (ID) by use of which the connection ID is identified.

In an aspect, if the device ID of new pair combination does not match with any of the authorized pair/combination already available in the database, the new pair/combination of the connection ID and the device ID can be stored in the database. This can be subjected to other existing validation methods for device ID.

In an aspect, the connection ID can be selected from any or combination of International Mobile Subscriber Identity (IMSI), phone number, SIM card number and any other Subscriber ID.

In an aspect, the device ID can be selected from any or combination of International Mobile Equipment Identity (IMEI), Electronic Serial Number (ESN) and MAC Address.

An aspect of the present disclosure relates to a method for detecting an authorized device in a network. The method for detecting an authorized device in a network can include the steps of: generating, a database of authorized pairs/combinations of connection identifications (IDs) and a device identifications (IDs), each record of said database having at least a pair/combination of at least a connection identification (ID) and at least a device identification (ID), wherein the device identification (ID) is an ID associated with a device, and a connection identification (ID) is an ID by which the system identifies a network connection uniquely; receiving, by a network monitor and server, a message either from a device or from a service provider for said device for authentication, the message comprising at least a pair/ combination of at least a connection ID and at least a device ID, the network monitor and server further querying said database of authorized pairs/combinations to determine presence of said pair/combination as received in the message; said method characterized by comprising the steps of: obtaining, at said by network monitor and server, if absence of the said pair/combination in said database is determined indicating a new pair/combination, and if the device ID in new pair/combination matches with the device ID of at least one authorized pair/combination already available in the database, from a user of the device, a linking code to associate the new pair/combination with at least one existing authorized pair/combination in the database whose device ID is same as that of the new pair/combination; and authenticating, at said by network monitor and server, based at least on the linking code obtained from the user, the device and said new pair/combination for the network, as the authorized device and authorized pair/combination.

FIG. 1A illustrates a network implementation of proposed system for detecting an authorized/unauthorized device in the network, in accordance with an exemplary embodiment of the present disclosure. In an embodiment, FIG. 1A illustrates a system 100 having a network monitor and server 102 to monitor or regulate or control an authorized/unauthorized device in the network 104.

Referring now to FIG. 1A, a network implementation 100 of the proposed system for detecting an authorized/unauthorized device in the network. In one embodiment, the proposed system 100 can include a database 110 of authorized pairs/combinations of connection identifications (IDs) and device identifications (IDs) and each record of the database having at least a pair/combination of a connection identification (ID) and a device identification (ID). The system 100 can include a network monitor and server 102 to receive a message either from a device or from a service provider for said device for authentication. In another aspect, the message can include at least a pair/combination of at least a connection ID and at least a device ID, the network monitor and server being further configured to query the database of authorized pairs/combinations to determine presence of said pair/combination as received in the message. In case if absence of the said pair/combination in said database is determined indicating a new pair/combination, and if the device ID in new pair/combination matches with the device ID of at least one authorized pair/combination already available in the database, the network monitor and server 102 is characterized to obtain, from a user of the device, a linking code to associate the new pair/combination with at least one existing authorized pair/combination in the database whose device ID is same as that of the new pair/combination and authenticate, based at least on the linking code obtained from the user, the device and said new pair/combination for the network as authorized device and authorized pair/combination.

In an exemplary embodiment, connection ID can be any or combination of parameters configured to collectively or individually identify the network connection uniquely. Examples of the connection ID can be selected from any or combination of IMSI or Phone Number or SIM Card Number etc.

In an exemplary embodiment, device ID can be any or combination of parameters configured to collectively or individually identify the device. Generally such device ID is sent to the network while registering with the network. Examples: IMEI or ESN etc.

It may be understood that the network monitor and server 102 may also be implemented in a variety of computing systems, such as a laptop computer, a desktop computer, a notebook, a workstation, a mainframe computer, a server, a network server, and the like. It may be understood one or more respective computing devices 106-1, 106-2 . . . 106-N, collectively referred to as user device 106 hereinafter, or applications residing on the computing devices 106 that may be accessed by multiple users 108-1, 108-2 . . . 108-N, collectively referred to as user 108 hereinafter through. A user can be a human or machine. Examples of the computing devices 106 may include, but are not limited to, a portable computer, a mobile handset, a personal digital assistant, a handheld device, and a workstation. The computing devices 106 are communicatively coupled to the network monitor and server 102 through a network 104.

In one implementation, the network 104 may be a wireless network, a wired network or a combination thereof. The network can be implemented as one of the different types of networks, such as intranet, local area network (LAN), wide area network (WAN), the internet, and the like. The network 104 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including switches, routers, bridges, servers, computing devices, storage devices, and the like.

In one implementation, the database 110 can be available on cloud or remote or present inside any device.

As used herein, the IoT devices can be a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a Wi-Fi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio.

IoT devices may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). Network device may include a home automation switch that may be coupled with a home appliance. In some embodiments, network devices may be used in other environments, such as a business, a school, an establishment, a park, or any place that can support a local area network to enable communication with network devices. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

In an embodiment, the proposed system 100 can create or generate database 110 or a list of device IDs and connection IDs, (hereinafter device IDs and connection IDs expressed as DC pairs) which are already existing in the network. In an exemplary embodiment, database 110 can store or generate list of DC pairs for example—user 1 device DC pair with, device ID such as IMEI number 358090074444764 and connection ID such as IMSI number 310150123456789 can be store in the database as the connection ID and device ID is existing in the network.

IMEI number is normally 15 digits long. The IMEI number can be found on the silver sticker on the back of the phone, under the battery pack, or on the box of the phone. IMEI number can also display on the screen of the mobile phone or smartphone by entering *#06# into the keypad. IMSI is usually presented as a 15 digit number, but can be shorter. For example, MTN South Africa's old IMSIs that are still being used in the market are shown as 14 digits. The first 3 digits are the mobile country code (MCC), which are followed by the mobile network code (MNC), either 2 digits (European standard) or 3 digits (North American standard). The length of the MNC depends on the value of the MCC, and it is recommended that the length is uniform within a MCC area. The remaining digits are the mobile subscription identification number (MSIN) within the network's customer base (mostly 10 or 9 digits depending on the MNC length). For example—IMSI number 460001357924680 for country china. MCC is 460 and MNC 00 and MSIN 1357924680.

In an embodiment, the database 110 and the network monitor and server 102 can be used to validate and regulate the use of devices in the network. The database 110 can include authorized DC pairs all these DC pairs may be treated as the list of permitted combination of Connection ID and Device ID in the system. After creation of the database 110, whenever a new DC pair intends to enter the network, the pair is first authenticated by the network monitor and server 102. In an exemplary embodiment, the new DC pair can include non-existing DC pairs like new connection ID and new device ID, new device ID and old connection, old device ID and new connection ID, and old connection ID and old device ID but not paired/used with each other as per the database. For example—if the user changes the existing SIM card with new SIM card and come up with old device only then DC pair can be considered as non-existing DC pair as IMSI is new.

In one embodiment, whenever a new pair/combination of connection ID and device ID needs to be permitted in the system, and device ID in new pair/combination matches with the device Id of at least one existing authorized pair/combination, following steps can be followed to control or regulate the use of device IDs in the concerned system of network. The system can ask/notify to get the identifier from the user for a previous connection ID, which was being used with the device under consideration. This Identifier can be Phone Number or anything else by use of which the system can identify a connection ID. By using this Identifier the system can be able to identify the previous connection ID. The database 110 can verify the previous connection ID or identified connection ID that was used with a device having device ID under consideration. The network monitor and server 102 can authenticate and ensure with sufficient reliability that the actual device being used with the previous connection ID or identified connection ID is the same actual device which is intended to be used with the connection ID in new pair/combination and not merely the device ID is matching; wherein the device authentication can be performed as follows.

Method 1—the system can send/transmit One Time Password (OTP) to the Connection ID in new pair/combination. The OTP can be sent using SMS or voice message or any other suitable way. The user can submit OTP back to the system using previous connection ID. So that it should be possible to assume that the actual device being used for Connection ID in new pair/combination is the same device which was used for the previous connection ID and not merely the device ID is matching. Hence the entry of devices or unauthorized device or devices with cloned device IDs can be restricted by this method. If this check is passed for the device under consideration, then the device can be identified as the existing device in the system which is allowed in the system.

Method 2—the system can send OTP to the previous connection ID. The OTP can be sent using SMS or voice message or any other suitable way. The user can submit OTP back to the system using connection ID in new pair/combination. So that it should be possible to assume that the actual device being used for connection ID in new pair/combination is the same Device which was used for the previous connection ID, and not merely the device ID is matching. Hence the system can restrict the entry of devices with cloned Device IDs. If this check is passed for the device under consideration, then the Device can be identified as the existing device in the system which was allowed in the system.

Method 3—User can submit the identifier for the connection ID in new pair/combination using previous connection ID for the device under consideration, such that user is conveying that it is a device which was previously used for other connection ID and now he/she wants to use the same device for connection ID in new pair/combination. Such identifier can be any or combination of Phone Number, IMSI, SIM card number or anything else by use of which the system can identify the connection ID. So that it should be possible to assume that the actual device being used for connection ID in new pair/combination is the same Device which was used for the previous connection ID, and not merely the device ID is matching. Hence the system can restrict the entry of devices with cloned device IDs. (This method should not be the preferable method, as the Identifier of the Connection ID may be public). If this check is passed for the device under consideration, then the Device can be identified as the existing device in the system which was allowed in the system.

Method 4—the user can submit the identifier for the previous connection ID using connection ID in new pair/combination for the device under consideration such that user is conveying that it is a device which was previously used for other connection ID and now he/she wants to use the same device for connection ID in new pair/combination. Such identifier can be any or combination of Phone Number, IMSI, SIM card number or anything else by use of which the system can identify the connection ID. So that it should be possible to assume that the actual device being used for connection ID in new pair/combination is the same device which was used for the previous connection ID, and not merely the device ID is matching. Hence the system can restrict the entry of devices with cloned device IDs. (This method should not be the preferable method, as the Identifier of the Connection ID may be public). If this check is passed for the device under consideration, then the device can be identified as the existing device in the system which was allowed in the system.

In an exemplary embodiment related to cellular network, whenever a user intends to change a SIM card from his device, according to the present invention, before changing the SIM card user will get an OTP from the network or system preferably after intimating the network or system about the intention of change of the SIM card. After changing the SIM card, user will submit the OTP and the phone number of previous SIM Card (or some unique parameter of previous SIM/connection ID) to the network/system, so that it should be possible to assume that the actual/current device being used for connection ID in new pair/combination is the same device which was used for the previous connection ID, and not merely the device ID is matching (i.e., cloned device). Based on this system will authenticate the new pair/combination as authorized pair/combination. In this case the combination of OTP and connection ID is acting as linking code. This type of implementation will cause the lesser inconvenience to the users.

In an exemplary embodiment, if the device used for connection Id in new pair/combination is the same device used for previous connection ID and not merely the device ID is matching then the system can authorize the connection ID in new pair/combination to work with the device ID under consideration. The system can authorize new DC pair under consideration, and this pair of connection ID and device ID may be entered in the list of authorized pairs/combinations. Also the system can allow selecting or choosing and/or removing or deleting for the pair of previous connection ID and device ID, in the list of authorized pairs/combination, and user may be informed accordingly. It is recommended to disallow the pair of previous connection Id and device ID, and user should be informed accordingly. This will create the greater awareness among the general users, and will be beneficial for overall security of the ecosystem.

In an exemplary embodiment, if the device ID of new pair/combination matches with the device ID of at least one authorized pair/combination in the database and if the device used for connection Id in new pair/combination is not the same device or is a different device than all of the authorized pairs/combinations in the database having same device ID indicating that the actual device in new pair/combination is not used for any previous connection ID or the previous connection ID provided by the user and merely the device ID is matching with some existing authorized pairs/combination, then the system may not authenticate the connection ID in new pair/combination to work with the device ID under consideration at the instant. Accordingly the new pair/combination of connection ID and device ID may not be entered in the list of authorized pairs/combination. But there should be option open for allowing the pair with further investigation or authentication. If the network approaches new device with new device ID that is not part of the database 110. Then the system can verify or check device ID or new device ID with the existing mechanism for verification of device ID for the concerned type of device (like verification of IMEI using existing rules like checksum and other databases available online). If the device ID satisfies the verification procedure then the device can be identified as genuine device and the respective pair/combination may be authenticated for the network and can be stored in the database as authorized pairs/combination.

In an exemplary embodiment, if the network approaches new device with new device ID that is not part of the database 110 such that the device ID does not match with the device ID of any of the existing authorized pairs/combination. Then the system can verify or check device ID or new device ID with the existing mechanism for verification of device ID for the concerned type of device (like verification of IMEI using existing rules like checksum and other databases available online like TAC codes). If the device ID satisfies the verification procedure then the device can be identified as genuine device and the respective pair/combination may be authenticated for the network and can be stored in the database as authorized pairs/combination.

In an exemplary embodiment, the connection ID associated with device ID can be retrieved and modified by the registered owner of the communication device having that device ID through any appropriate interface.

It may be appreciated that, the OTP can be sent or transmitted to the user on any of the connection ID involved or the registered mobile number of the user or registered email ID or whatsapp or audio notification.

Figure 1B:
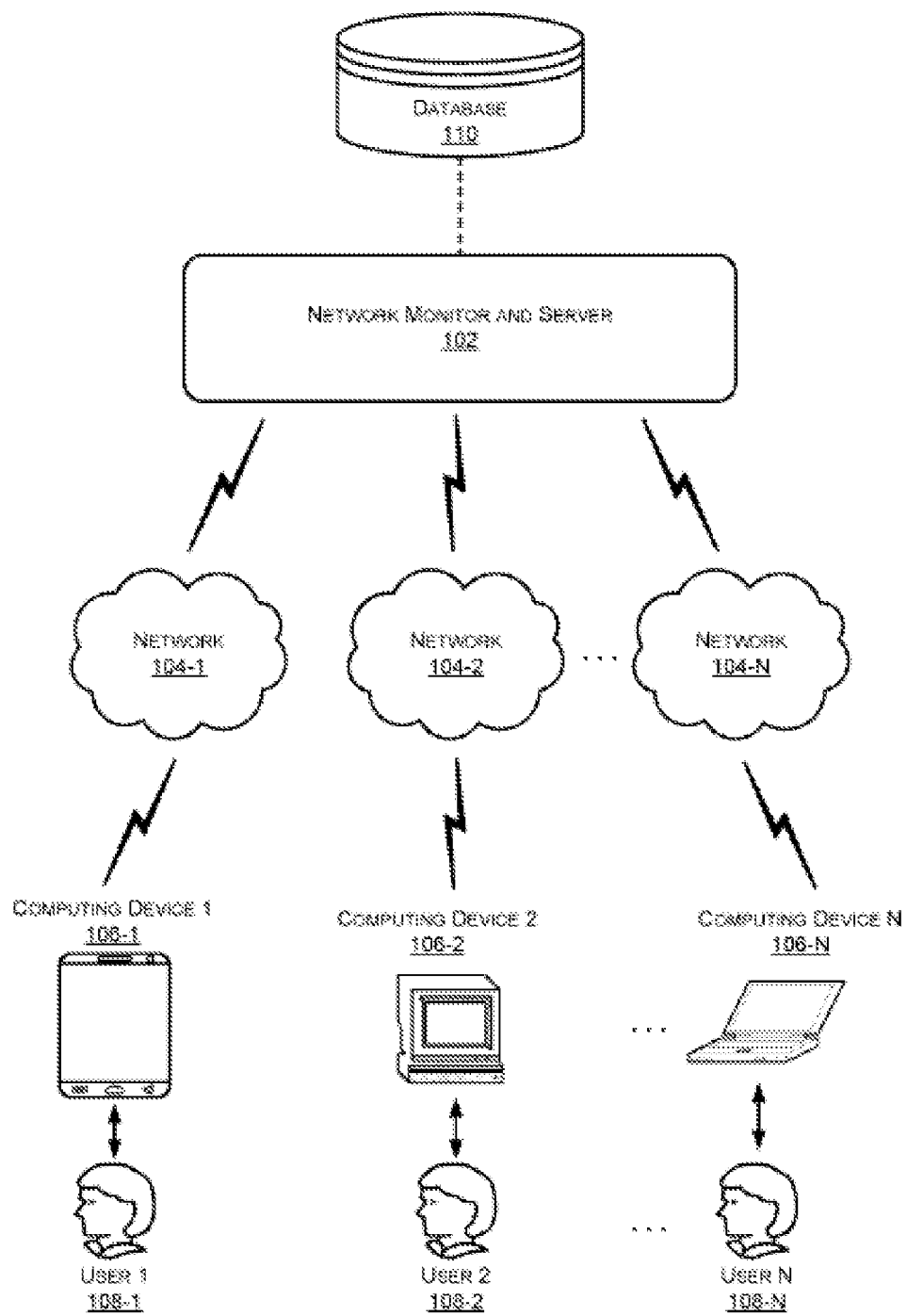

FIG. 1B illustrates a network implementation of proposed system for detecting an authorized/unauthorized device in the network of multiple networks, in accordance with an exemplary embodiment of the present disclosure.

As shown in FIG. 1B, the proposed system can include one or more network such as network 1, 104-1, network-2, 104-2 and network-n, **104-*h* that can be connected to the network monitor and server 102 and computing device 106. It may be understood that one or more respective network 104-1, 104-2 and 104-*h*, collectively referred to as network 104** through.

In an embodiment, the database 110 and the network monitor and server 102 can be used to validate and regulate the use of devices in the network. The database 110 can include DC pairs; all these DC pairs may be treated as the list of permitted pair/combination of Connection ID and Device ID in the system. After creation of the database 110, whenever a new DC pair intends to enter the network, the pair is first authenticated by the network monitor and server 102. In an exemplary embodiment, the new DC pair can include non existing DC pairs like new connection ID and new device ID, new device ID and old connection, old device ID and new connection ID, and old connection ID and old device ID but not paired/used with each other as per the database. For example—if the user changes the existing SIM card with new SIM card and come up with old device only then DC pair can be considered as non-existing DC pair as IMSI is new.

In an exemplary embodiment, connection ID can be any or combination of parameters configured to collectively or individually identify the network connection. Examples of the connection ID can be selected from any or combination of IMSI or Phone Number or SIM Card Number etc.

In an exemplary embodiment, device ID can be any or combination of parameters configured to collectively or individually identify the device. Generally such device ID is sent to the network while registering with the network. Examples: IMEI or ESN etc.

It may be understood that the network monitor and server 102 may also be implemented in a variety of computing systems, such as a laptop computer, a desktop computer, a notebook, a workstation, a mainframe computer, a server, a network server, a cloud server and the like. It may be understood one or more respective computing devices 106-1, 106-2 . . . 106-N, collectively referred to as user device 106 hereinafter, or applications residing on the computing devices 106 that may be accessed by multiple users 108-1, 108-2 . . . 108-N, collectively referred to as user 108 hereinafter through. Examples of the computing devices 106 may include, but are not limited to, a portable computer, a personal digital assistant, a mobile handset, a handheld device, and a workstation. The computing devices 106 are communicatively coupled to the network monitor and server 102 through a network 104.

In one implementation, the network 104 may be a wireless network, a wired network or a combination thereof. The network can be implemented as one of the different types of networks, such as intranet, local area network (LAN), wide area network (WAN), the internet, the network of cellular networks operated by various service providers on various technologies and the like. The network 104 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including switches, routers, bridges, servers, computing devices, storage devices, and the like.

In one implementation, the database 110 can be available on cloud or remote or present inside any device.

In an embodiment, each time the computing device 106 is switched on and requests a connection with concerned network 104. The computing device can transmit the information about connection ID and device ID to the network 104. The network 104 can verify these parameters such as connection ID and device ID and authenticate the connection.

Figure 2:
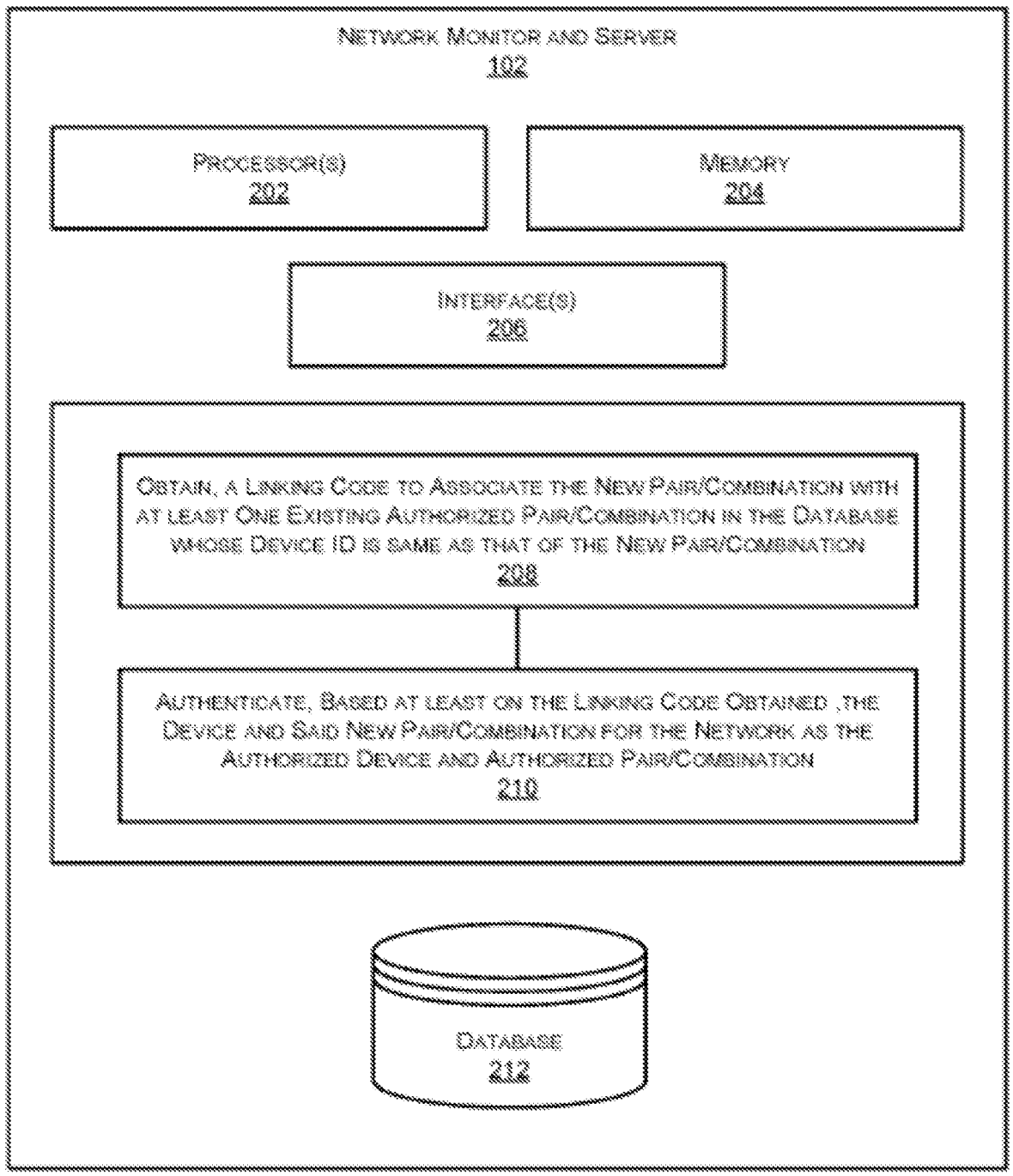
FIG. 2 illustrates exemplary functional modules of network monitor and server for detecting an authorized/unauthorized device in the network, in accordance with an exemplary embodiment of the present disclosure.

FIG. 2 illustrates exemplary functional modules of a network monitor and server for detecting an authorized/unauthorized device in the network, in accordance with an exemplary embodiment of the present disclosure. Referring now to FIG. 2, the network monitor and server 102 is illustrated in accordance with an embodiment of the present subject matter. In one embodiment, the network monitor and server 102 may include at least one processor 202, an input/output (I/O) interface 206, and a memory 204. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 204.

The I/O interface 206 may include a variety of software and hardware interfaces, for example, a web interface, a graphical user interface, and the like. The I/O interface 206 may allow the network monitor and server 102 to interact with a user directly or through the network 104. Further, the I/O interface 206 may enable the network monitor and server 102 to communicate with other computing devices, such as web servers and external data servers (not shown). The I/O interface 206 can facilitate multiple communications within a wide variety of networks and protocol types, including wired networks, for example, LAN, cable, etc., and wireless networks, such as WLAN, cellular, or satellite. The I/O interface 206 may include one or more ports for connecting a number of devices to one another or to another server.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 may include obtain module 208 and authentication module 210 and database 212.

The modules 208 include routines, programs, objects, components, data structures, etc., which perform particular tasks or implement particular abstract data types. In one implementation, the modules may include obtain module 208 and authentication module 210 and other modules. The other modules may include programs or coded instructions that supplement applications and functions of the system.

The database 212, amongst other things, serves as a repository for storing data processed, received, and generated by one or more of the modules. The database 212 may also include a stream database, a personal information database, a system database, and other data. The other data may include data generated as a result of the execution of one or more modules in the other module.

Referring to FIG. 2, a detailed working of the obtain module 208 along with the working of other components of the proposed system is illustrated, in accordance with an embodiment of the present subject matter. In one implementation, the obtain module 208 can obtain, from a user of the device, a linking code to associate the new pair/combination with at least one existing authorized pair/combination in the database whose device ID is same as that of the new pair/combination. In an embodiment, the authentication module 210 can authenticate the device and new pair/combination for the network, based at least on the linking code obtained from the user, as the authorized device and authorized pair/combination.

Figure 3:
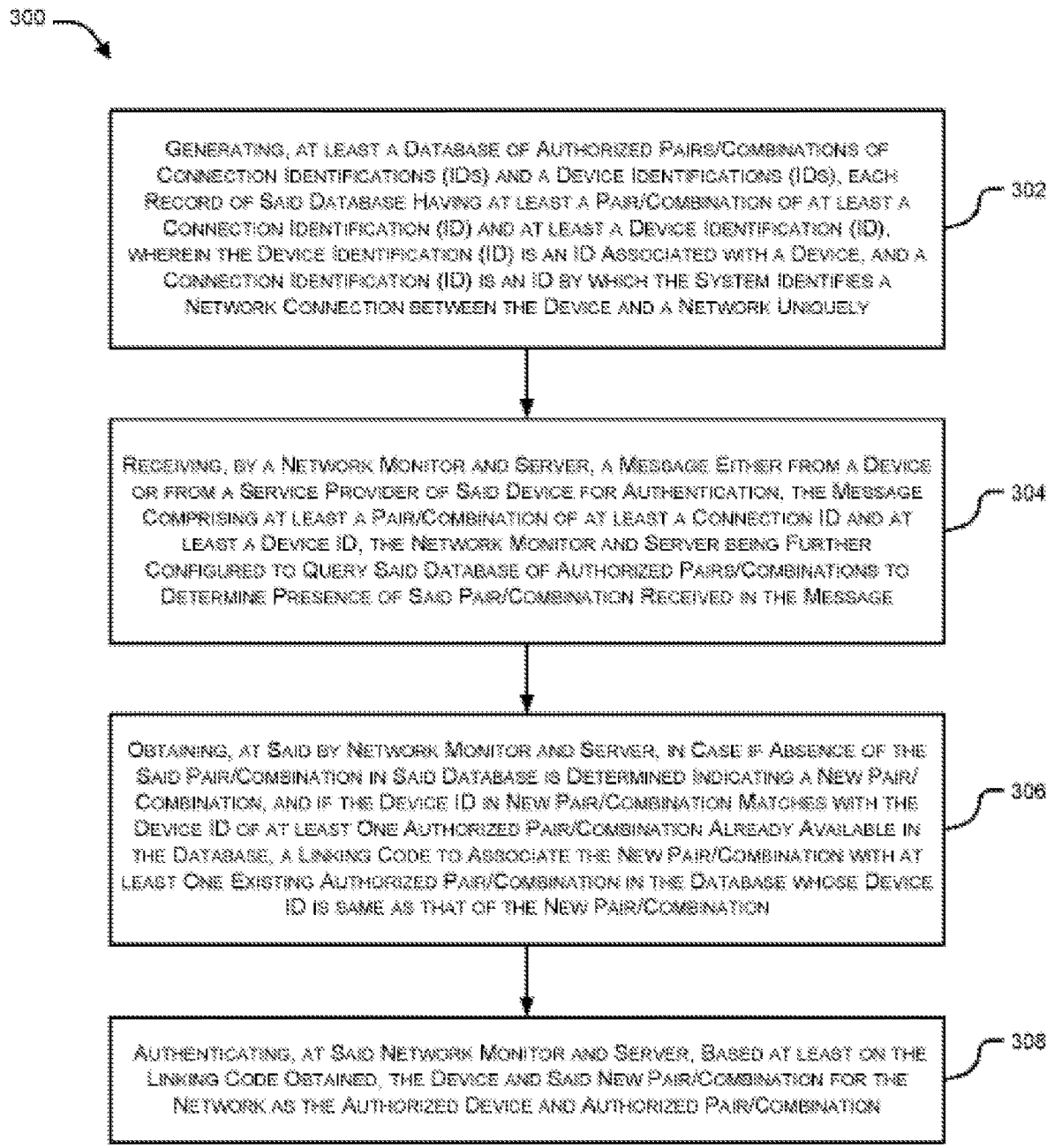
FIG. 3 illustrates an exemplary flow diagram for implementation of proposed system, in accordance with an exemplary embodiment of the present disclosure.

FIG. 3 illustrates an exemplary flow diagram for implementation of proposed system, in accordance with an exemplary embodiment of the present disclosure. In an aspect, the proposed method 300 may be described in general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 as described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described the proposed system.

At step 302, generating, a database of authorized pairs/combination of connection identifications (IDs) and device identifications (IDs), each record of said database having at least a pair/combination of at least a connection identification (ID) and at least a device identification (ID), wherein the device identification (ID) can be an ID associated with a device hardware which is sent over to the network for registration, and a connection identification (ID) is an ID by which the system identifies a network connection uniquely.

At step 304, receiving, by a network monitor and server, a message either from a device or from a service provider for said device for authentication, the message comprising at least a pair/combination of at least a connection ID and at least a device ID, the network monitor and server further querying the database to determine presence of said pair/combination as received in the message.

At step 306, obtaining, at said by a network monitor and server, if absence of the pair/combination in the database is determined indicating a new pair/combination, and if the device ID matches with the device ID of at least one authorized pair/combination already available in the database, from a user of the device, a linking code to associate the new pair/combination with at least one existing authorized pair/combination in the database whose device ID is same as that of the new pair/combination.

At step 308, authenticating, at said by a network monitor and server, the device and said new pair/combination for the network, based at least on the linking code obtained from the user, as the authorized device and authorized pair/combination.

Figure 4:
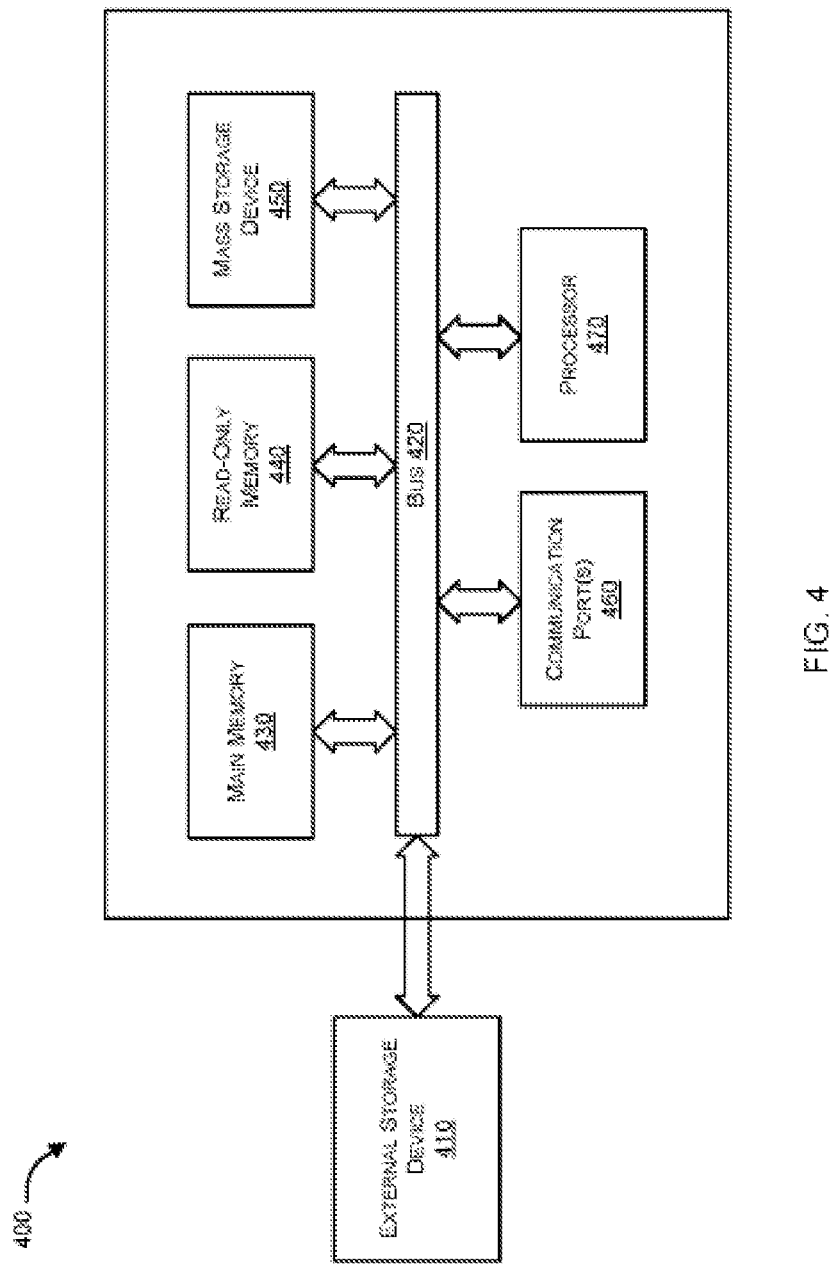
FIG. 4 illustrates a computer system utilized for implementation of the proposed system, in accordance with an exemplary embodiment of the present disclosure.

FIG. 4 illustrates an exemplary computer system utilized for implementation of the proposed system in accordance with an exemplary embodiment of the present disclosure. In an embodiment, proactive network security assessment based on benign variants of known threats can be implemented in the computer system 400 to enable aspects of the present disclosure. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As shown in the figure, computer system 400 includes an external storage device 410, a bus 420, a main memory 430, a read only memory 440, a mass storage device 450, communication port 460, and a processor 470.

A person skilled in the art will appreciate that computer system 400 may include more than one processor and communication ports. Examples of processor 470 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 470 may include various modules associated with embodiments of the present invention. Communication port 460 can be any of an RS-232 port for use with a modem based dialup connection, a 10/100 Ethernet port, a Gigabit or 10 Gigabit port using copper or fiber, a serial port, a parallel port, or other existing or future ports. Communication port 460 may be chosen depending on a network, such a Local Area Network (LAN), Wide Area Network (WAN), or any network to which computer system 400 connects. Memory 430 can be Random Access Memory (RAM), or any other dynamic storage device commonly known in the art. Read only memory 440 can be any static storage device(s) e.g., but not limited to, a Programmable Read Only Memory (PROM) chips for storing static information e.g., start-up or BIOS instructions for processor 470. Mass storage 450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc. Bus 420 communicatively couples processor(s) 470 with the other memory, storage and communication blocks. Bus 420 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 470 to software system. Optionally, operator and administrative interfaces, e.g. a display, keyboard, and a cursor control device, may also be coupled to bus 420 to support direct operator interaction with computer system 400. Other operator and administrative interfaces can be provided through network connections connected through communication port 460. External storage device 410 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

It should be appreciated that, the proposed system is based on the pairing of connection ID with device ID. In the proposed system or a network there can be many pairs of connection ID and device ID. In the proposed system some device ID can be used with multiple connection IDs and also some connection ID can be used with multiple device IDs.

It may be appreciated that, communication devices for use on the network are manufactured with device ID, known as the International Mobile Equipment Identifier (IMEI), ESN, MAC address etc. Each communication device is also associated with the connection ID, e.g. an international mobile subscriber identifier (IMSI) for cellular networks, Subscriber IDs, etc which uniquely identifies a subscriber of a communication network.

Those skilled in the art will appreciate that the above-described embodiments are exemplary only, and that further embodiments encompassing other modifications or alternatives may be envisaged. Reference herein to IMEIs is not limited thereto, and may encompass other suitable device ID. Reference herein to IMSIs is not limited thereto, and may encompass other suitable connection ID.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring minimum one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure, as described in the claims.

In the description of the present specification, reference to the term "one embodiment," "an embodiments", "an example", "an instance", or "some examples" and the description is meant in connection with the embodiment or example described in the particular feature, structure, material, or characteristic included in the present invention, at least one embodiment or example. In the present specification, the term of the above schematic representation is not necessarily for the same embodiment or example. Furthermore, the particular features, structures, materials, or characteristics described in any one or more embodiments or examples in proper manner.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides a system and method for suppression/prevention of the use of cloned device IDs such as cloned/unauthentic cell phone devices in a cellular network and/or detecting an authorized/unauthorized device in the network.

The present disclosure provides a system and method to control or regulate the usage of unauthorized devices in the network.

The present disclosure provides system and method to regulate and/or control the usage of device ID, so as to minimize the usage of unauthorized devices in the network.

What is claimed is:

1. A system for detecting an authorized device in a network, comprising:
at least a database of authorized pairs/combinations of connection identifications (IDs) and a device identifications (IDs), each record of said database having at least a pair/combination of at least a connection identification (ID) and at least a device identification (ID), wherein the device identification (ID) is an ID associated with a device, and a connection identification (ID) is an ID by which the system identifies a network connection between the device and a network uniquely; and
a network monitor and server configured to receive a message either from a device or from a service provider of said device for authentication, the message comprising at least a pair/combination of at least a connection ID and at least a device ID, the network monitor and server being further configured to query said database of authorized pairs/combinations to determine presence of said pair/combination received in the message;
said network monitor and server, in case if absence of the said pair/combination in said database is determined indicating a new pair/combination, and if the device ID in new pair/combination matches with the device ID of at least one authorized pair/combination already available in the database, said network monitor and server is characterized to:
obtain, a linking code to associate the new pair/combination with at least one existing authorized pair/combination in the database whose device ID is same as that of the new pair/combination; and
authenticate, based at least on the linking code obtained, the device and said new pair/combination for the network as the authorized device and authorized pair/combination.

2. The system as claimed in claim 1, wherein the connection ID is any or combination of parameters configured to collectively or individually identify the network connection uniquely.

3. The system as claimed in claim 1, wherein the device ID is any or combination of parameters configured to collectively or individually identify the device.

4. The system as claimed in claim 1, wherein said new pair/combination comprises any or combination of:

an existing device ID and existing connection ID (but not paired with each other as per the database);
an existing device ID (already available in the database) and a new connection ID; a new device ID and an existing connection ID (already available in the database); and
a new device ID and a new connection ID.

5. The system as claimed in claim 1, wherein said linking code is sent from the connection ID of said existing authorized pair/combination in the database whose device ID is same as the device ID of the said new pair/combination.

6. The system as claimed in claim 1, wherein said linking code is sent from the connection ID received in said new pair/combination.

7. The system as claimed in claim 1, wherein the linking code is a one-time password (OTP) sent to the connection ID of said existing authorized pair/combination in the database whose device ID is same as the device ID of the said new pair/combination, and obtained, from the user, from the connection ID selected from said new pair/combination.

8. The system as claimed in claim 1, wherein the linking code is a one-time password (OTP) sent to the connection ID selected from said new pair/combination, and obtained, from the user, from the connection ID of said existing authorized pair/combination in the database whose device ID is same as the device ID of the said new pair/combination.

9. The system as claimed in claim 1, wherein, upon authentication, the new pair/combination of the connection ID and the device ID is authenticated for the network.

10. The system as claimed in claim 1, wherein, upon authentication failure, the new pair/combination of the connection ID and the device ID is not authenticated for the network.

11. The system as claimed in claim 1, wherein the linking code is identification (ID) based on which the connection ID is identified.

12. The system as claimed in claim 1, wherein if the device ID of new pair/combination does not match with the device ID of any of the authorized pair/combination already available in the database, the new pair/combination of the connection ID and the device ID is stored in said database of authorized pairs/combinations.

13. The system as claimed in claim 1, wherein the connection ID is selected from any or combination of International Mobile Subscriber Identity (IMSI), phone number, SIM card number, and unique Subscriber ID.

14. The system as claimed in claim 1, wherein the device ID is selected from any of combination of International Mobile Equipment Identity (IMEI), Electronic Serial Number (ESN) and MAC address.

15. A method for detecting an authorized device in a network, comprising the steps of:
generating, at least a database of authorized pairs/combinations of connection identifications (IDs) and a device identifications (IDs), each record of said database having at least a pair/combination of at least a connection identification (ID) and at least a device identification (ID), wherein the device identification (ID) is an ID associated with a device, and a connection identification (ID) is an ID by which the system identifies a network connection between the device and a network uniquely; receiving, by a network monitor and server, a message either from a device or from a service provider of said device for authentication, the message comprising at least a pair/combination of at least a connection ID and at least a device ID, the network monitor and server being further configured to query said database of authorized pairs/combinations to determine presence of said pair/combination received in the message;
wherein said method is characterized by comprising the steps of:
obtaining, at said by network monitor and server, in case if absence of the said pair/combination in said database is determined indicating a new pair/combination, and if the device ID in new pair/combination matches with the device ID of at least one authorized pair/combination already available in the database, a linking code to associate the new pair/combination with at least one existing authorized pair/combination in the database whose device ID is same as that of the new pair/combination; and
authenticating, at said network monitor and server, based at least on the linking code obtained, the device and said new pair/combination for the network as the authorized device and authorized pair/combination.

* * * * *